(12) United States Patent
Yeung et al.

(10) Patent No.: US 11,087,529 B2
(45) Date of Patent: Aug. 10, 2021

(54) INTRODUCING REAL-TIME LIGHTING EFFECTS TO ILLUMINATE REAL-WORLD PHYSICAL OBJECTS IN SEE-THROUGH AUGMENTED REALITY DISPLAYS

(71) Applicant: Disney Enterprises, Inc., Burbank, CA (US)

(72) Inventors: Jason A. Yeung, Glendale, CA (US); Kenneth J. Mitchell, Glendale, CA (US); Timothy M. Panec, Studio City, CA (US); Elliott H. Baumbach, Porter Ranch, CA (US); Corey D. Drake, Sunland, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/586,503

(22) Filed: Sep. 27, 2019

(65) Prior Publication Data
US 2021/0097757 A1    Apr. 1, 2021

(51) Int. Cl.
*G06T 19/00* (2011.01)
*G06T 15/50* (2011.01)
(Continued)

(52) U.S. Cl.
CPC ........ *G06T 15/506* (2013.01); *G02B 27/0172* (2013.01); *G06T 7/13* (2017.01);
(Continued)

(58) Field of Classification Search
CPC ............. G06T 19/006; G06T 15/50–87; G06T 15/506; G06T 7/13; G06T 17/00;
(Continued)

(56) References Cited

U.S. PATENT DOCUMENTS 8,797,321 B1 * 8/2014 Bertolami ............... G06T 15/50
345/426
10,217,286 B1 * 2/2019 Angel ................ G06K 9/00302
(Continued)

OTHER PUBLICATIONS

Fuhrmann et al., "Occlusion in collaborative augmented environments", 1999, Computers & Graphics 23 (1999), pp. 809-819 (Year: 1999).*

(Continued)

*Primary Examiner* — Phong X Nguyen
(74) *Attorney, Agent, or Firm* — Patterson + Sheridan, LLP

(57) ABSTRACT

Embodiments provide for the rendering of illumination effects on real-world objects in augmented reality systems. An example method generally includes overlaying a shader on the augmented reality display. The shader generally corresponds to a three-dimensional geometry of an environment in which the augmented reality display is operating, and the shader generally comprises a plurality of vertices forming a plurality of polygons. A computer-generated lighting source is introduced into the augmented reality display. One or more polygons of the shader are illuminated based on the computer-generated lighting source, thereby illuminating one or more real-world objects in the environment with direct lighting from the computer-generated lighting source and reflected and refracted lighting from surfaces in the environment.

20 Claims, 6 Drawing Sheets

(51) Int. Cl.
*G06T 7/13* (2017.01)
*G06T 17/00* (2006.01)
*G02B 27/01* (2006.01)
*G06T 15/80* (2011.01)

(52) U.S. Cl.
CPC .............. *G06T 15/80* (2013.01); *G06T 17/00* (2013.01); *G06T 19/006* (2013.01); *G02B 2027/014* (2013.01); *G02B 2027/0138* (2013.01)

(58) Field of Classification Search
CPC ........ G02B 27/0172; G02B 2027/0138; G02B 2027/014
See application file for complete search history.

(56) References Cited

U.S. PATENT DOCUMENTS

| | | | | |
|---|---|---|---|---|
| 10,489,961 | B2* | 11/2019 | Festa | G06T 15/04 |
| 10,559,121 | B1* | 2/2020 | Moudgil | G06T 15/50 |
| 10,692,288 | B1* | 6/2020 | Rasmussen | A63F 13/213 |
| 10,777,010 | B1* | 9/2020 | Patel | G06T 19/006 |
| 2005/0024734 | A1* | 2/2005 | Richards | H04N 9/3111 |
| | | | | 359/634 |
| 2010/0302245 | A1* | 12/2010 | Best | G06T 19/00 |
| | | | | 345/426 |
| 2012/0068913 | A1* | 3/2012 | Bar-Zeev | G02B 27/0172 |
| | | | | 345/8 |
| 2013/0048716 | A1* | 2/2013 | Gobetti | G09G 3/3406 |
| | | | | 235/380 |
| 2013/0083061 | A1* | 4/2013 | Mishra | A63F 13/213 |
| | | | | 345/633 |
| 2013/0141434 | A1* | 6/2013 | Sugden | G06T 7/11 |
| | | | | 345/426 |
| 2014/0015826 | A1* | 1/2014 | Licata | G06T 15/04 |
| | | | | 345/419 |
| 2014/0125668 | A1* | 5/2014 | Steed | G06T 15/50 |
| | | | | 345/426 |
| 2014/0354645 | A1* | 12/2014 | Imber | G06T 15/60 |
| | | | | 345/426 |
| 2015/0097834 | A1* | 4/2015 | Ma | G06T 15/60 |
| | | | | 345/426 |
| 2015/0279113 | A1* | 10/2015 | Knorr | G06T 15/50 |
| | | | | 345/633 |
| 2015/0363978 | A1* | 12/2015 | Maimone | G02B 27/017 |
| | | | | 345/633 |
| 2016/0225164 | A1* | 8/2016 | Tomlin | G06T 19/006 |
| 2017/0119471 | A1* | 5/2017 | Winner | G16H 50/50 |
| 2018/0005453 | A1* | 1/2018 | Siddiqui | G06T 7/73 |
| 2018/0130252 | A1* | 5/2018 | Seibert | G06T 15/06 |
| 2019/0228567 | A1* | 7/2019 | Park | G06T 15/50 |
| 2020/0265638 | A1* | 8/2020 | Koperwas | G02B 27/017 |
| 2020/0273240 | A1* | 8/2020 | Anderegg | G06T 19/006 |

OTHER PUBLICATIONS

Dr. Simon Taylor, "Magic Leap Demo Video—A Thecnical Analyst," Oct. 23, 2015, [Accessed Online] [https://www.zappar.com/blog/magic-leap-demo-video-a-technical-analysis/].

Tai-Hsiang Huang, Ting-Chun Wang and Homer H. Chen, "Radiometric Compensation of Images Projected on Non-White Surfaces by Exploiting Chromatic Adaptation and Perceptual Anchoring," IEEE Transactions on Image Processing (vol. 26, Issue: 1, Jan. 2017) pp. 147-159 (Abstract Only).

Yuta Itoh, Takumi Hamasaki, and Maki Sugimoto, "Occlusion Leak Compensation for Optical See-Through Displays Using a Single-Layer Transmissive Spatial Light Modulator," IEEE Transactions on Visualization and Computer Graphics (vol. 23, Issue: 11, Nov. 2017) pp. 2463-2473 (Abstract Only).

Giovanni Avveduto, Franco Tecchia and Henry Fuchs, "Real-World Occlusion in Optical See-Through AR Displays," VRST '17 Proceedings of the 23rd ACM Symposium on Virtual Reality Software and Technology, Nov. 8-10, 2017 (Abstract Only).

Oliver Bimber and Bernd Frohlich, "Occlusion Shadows: Using Projected Light to Generate Realistic Occlusion Effects for View-Dependent Optical See-Through Displays," Fraunhofer Center for Research in Computer, 10 pages.

Je-Ho Ryu, Jae-Woo Kim, Kang-Kyu Lee and Jong-Ok Kim, "Colorimetric Background Estimation for Color Blending Reduction of OST-HMD," Korea University, Seoul, Korea, 4 pages.

Amit H. Bermano Markus Billeter, Daisuke Iwai, and Anselm Grundhofer, "Makeup Lamps: Live Augmentation of Human Faces via Projection," EUROGRAPHICS 2017, vol. 36 (2017), No. 2, 13 pages.

Anselm Grundhofer and Oliver Bimber, "Real-Time Adaptive Radiometric Compensation," IEEE Transactions on Visualization and Computer Graphics (vol. 14, Issue: 1, Jan.-Feb. 2008) pp. 97-108.

Chang Liu, Alexander Plopski, Kiyoshi Kiyokawa, Photchara Ratsamee and Jason Orlosky, "IntelliPupil: Pupillometric Light Modulation for Optical See-Through Head-Mounted Displays," IEEE International Symposium on Mixed and Augmented Reality (ISMAR), Oct. 16-20, 2018.

Skyler Greenman, "Virtual Lighting Interface HoloLens", published on YouTube Apr. 15, 2017 [https://www.youtube.com/watch?v=P7Rrf1Ugra4].

* cited by examiner

INTRODUCING REAL-TIME LIGHTING EFFECTS TO ILLUMINATE REAL-WORLD PHYSICAL OBJECTS IN SEE-THROUGH AUGMENTED REALITY DISPLAYS

BACKGROUND

Field

Aspects of the present disclosure relate to augmented reality displays, and more specifically to rendering lighting effects on real-world objects in an augmented reality display.

Description of the Related Art

Head-mounted augmented reality devices (also referred to as head-mounted displays, or "HMDs") generally are display devices that are worn on a user's head and display, to the wearer of the device, an image of the real-world environment in which the HMD is being used with additional information superimposed on the image of the real-world environment. Some of these devices may be opaque to the outside world. Using a camera coupled with the HMD, these devices generally capture images of the real-world environment in which the HMD is being used and combine these captured images with augmented reality content rendered in a layer with a transparent background (e.g., a layer with a transparent alpha channel). Other devices, known as see-through HMDs, may have semi-transparent lenses and a projector configured to display augmented reality content on the semi-transparent lenses, which may allow a user to view the real-world environment in which the HMD is being used with additional content superimposed over the real-world environment.

The real-world environment in which an HMD is being used generally includes a variety of objects made from different materials. Some of these materials may have low reflectivity (e.g., having matte finishes or other non-reflective surfaces) and thus may reflect light in a diffused manner or not reflect light. Other surfaces in the real-world environment, such as polished metal surfaces, glass, mirrors, and the like may have highly reflective surfaces that directly reflect light shining on the surface. An amount of light reflected by any object may, thus, differ based on how reflective each surface in the real-world environment is, based on whether the object is within a line of sight of a light source, the intensity of the light source, and the like.

In augmented reality systems, artificial, or computer-generated, light sources may be digital objects overlaid on the environment in which the HMD is being used. For see-through HMDs, overlaying a lighting source over the real-world environment may result in a digital object being displayed in the user's view of the real-world environment. However, rendering a lighting source and overlaying the lighting source in the user's view of the real-world environment may not modify the user's view of the real-world environment beyond displaying the lighting source in the user's view of the real-world environment.

SUMMARY

One embodiment described herein is a method for rendering lighting effects in an augmented reality display. The method generally includes overlaying a shader on the augmented reality display. The shader generally corresponds to a three-dimensional geometry of an environment in which the augmented reality display is operating, and the shader generally comprises a plurality of vertices forming a plurality of polygons. A computer-generated lighting source is introduced into the augmented reality display. One or more polygons of the shader are illuminated based on the computer-generated lighting source, thereby illuminating one or more real-world objects in the environment with direct lighting from the computer-generated lighting source and reflected and refracted lighting from surfaces in the environment.

Another embodiment described herein is a system for rendering lighting effects in an augmented reality display. The system generally includes a processor and memory. The memory stores instructions that, when executed by the processor, performs an operation that generally includes overlaying a shader on the augmented reality display. The shader generally corresponds to a three-dimensional geometry of an environment in which the augmented reality display is operating, and the shader generally comprises a plurality of vertices forming a plurality of polygons. A computer-generated lighting source is introduced into the augmented reality display. One or more polygons of the shader are illuminated based on the computer-generated lighting source, thereby illuminating one or more real-world objects in the environment with direct lighting from the computer-generated lighting source and reflected and refracted lighting from surfaces in the environment.

Still another embodiment described herein is a head-mounted display for rendering and displaying an augmented reality experience. The head-mounted display generally includes a non-blocking display screen and a system for rendering content on the non-blocking display. Generally, the environment in which the head-mounted display is operating is visible through the non-blocking display screen. The system generally overlays a shader on the non-blocking display screen. The shader generally corresponds to a three-dimensional geometry of an environment in which the augmented reality display is operating, and the shader generally comprises a plurality of vertices forming a plurality of polygons. A computer-generated lighting source is introduced into the augmented reality display. One or more polygons of the shader are illuminated based on the computer-generated lighting source, thereby illuminating one or more real-world objects in the environment with direct lighting from the computer-generated lighting source and reflected and refracted lighting from surfaces in the environment.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments of the present disclosure describe augmented reality systems that render, from computer-generated light sources displayed in an augmented reality display, lighting effects on real-world objects in the environment in which the augmented reality display is being used. In one embodiment, the augmented reality system includes a shader generated from a three-dimensional geometry of the environment in which the augmented reality display is being used. The shader generally includes a plurality of vertices connected to form a plurality of polygons. In some embodiments, the shader may have a flat texture, and the vertices may be unilluminated, such that in the absence of computer-generated light sources, the shader is transparent to the user of the augmented reality display. When computer-generated light sources are introduced into the augmented reality display, vertices of the shader may be illuminated to render lighting effects on one or more polygons in the shader corresponding to locations of different real-world objects.

By rendering lighting effects in a shader overlaid on a user's view of the real-world environment in which the user is wearing an augmented reality display, embodiments described herein may generate scenes in an augmented reality display that realistically model light interaction (e.g., reflection, refraction, absorption, diffusion, etc.) of computer-generated light sources on real-world objects. In some embodiments, the shader may be used to make additional modifications to the user's view of the real-world environment. For example, shaders can be customized to compensate for a user's visual deficiencies so that the entirety of a scene is viewed through a color compensating filter that allows the user to see the actual colors, or an approximation of the actual colors, of the real-world environment. Computer-generated light sources may further be layered on top of a customized shader so that the lighting effects on real-world objects are rendered in a color-corrected manner.

Figure 1A:
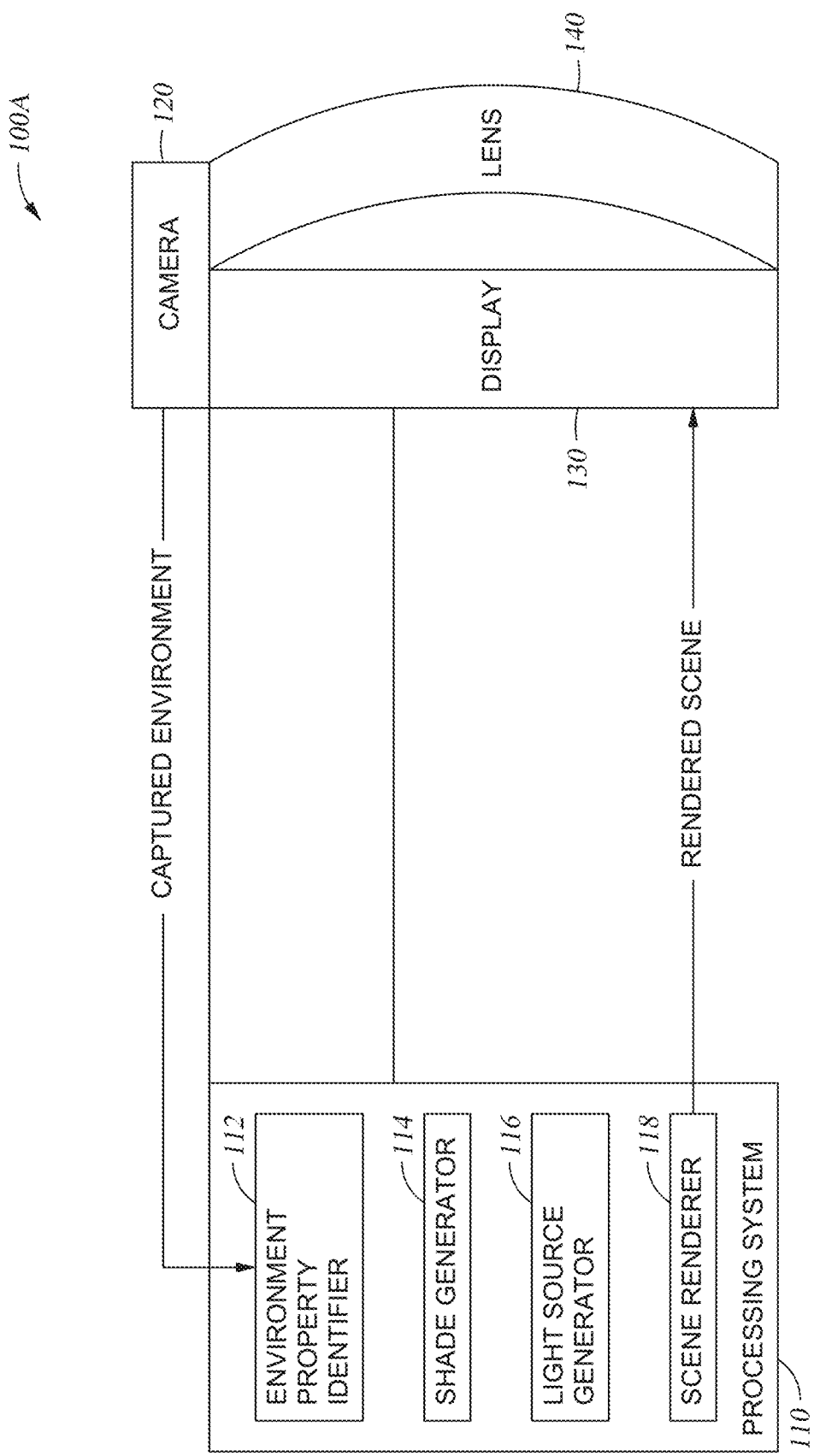
FIG. 1A is a block diagram of a head-mounted augmented reality display in which a shader is used to display lighting effects on objects in the real-world environment visible in an augmented reality display, according to one embodiment described herein.

FIG. 1A illustrates a block diagram of an example head-mounted augmented reality display 100A in which shaders are generated and used to render artificial lighting effects on real-world objects in the augmented reality display, according to one embodiment described herein. Generally, head-mounted augmented reality display 100A may be a see-through display through which a user of the augmented reality display 100A can directly view the real-world environment in which the user is using the head-mounted augmented reality display 100A (as opposed to a digital image of the real-world environment). The head-mounted augmented reality display 100A may overlay the user's perspective of the real-world environment with a computer-generated display of one or more digital objects. As illustrated, augmented reality display 100A includes a processing system 110, a camera 120, a display 130, and a lens 140.

Processing system 110 is generally configured to generate a shader from one or more images of the real-world environment in which augmented reality display 100A is operating, render the generated shader on display 130, and render digital objects and lighting effects created by the rendered digital objects using the generated shader. As discussed above, by rendering lighting effects using the generated shader, computer-generated light sources that exist only in the augmented reality space can display lighting effects over real-world objects in the environment. By displaying lighting effects over real-world objects, processing system 110 can render a more realistic augmented reality experience than an augmented reality experience in which digital objects are overlaid on a real-world environment without rendering lighting effects on real-world objects.

As illustrated, processing system 110 includes an environment property identifier 112, shader generator 114, light source generator 116, and scene renderer 118. Environment property identifier 112 uses one or more images of the real-world environment to determine the geometry of the real-world environment and other properties that may be used in rendering lighting effects various objects in the real-world environment. The one or more images of the real-world environment may be received as still images, sequences of still images, or video feeds. Generally, environment property identifier 112 receives a plurality of images from camera 120, which may be connected to processing system 110 via a cable or wirelessly, and can use information such as focus distance, depth detection, and other distance-related attributes to determine the geometry of the real-world environment. For example, augmented reality distance determination techniques can be used to determine the distance between different objects in the real-world environment, which may affect an amount of light reflecting on an object, as light intensity may decrease as distance between objects increases. In some embodiments, system 110 can identify and/or confirm the presence of various objects within the real-world environment using various tagging techniques, such as based on information broadcast wirelessly from various objects (e.g., through NFC, Bluetooth, or other wireless communications protocols), scanning of barcodes (e.g., QR codes), and the like.

In some embodiments, room property identifier 112 can control camera 120 and lighting components associated with camera 120 to obtain images of the real-world environment with additional illumination directed to real-world objects in the environment and without additional illumination directed to the real-world objects. Based on differences in pixel brightness between images of a real-world object without additional illumination and with additional illumination, room property identifier 112 can determine the reflectivity of a surface. For example, highly reflective surfaces, such as mirrors, polished metal, and the like may have a large difference in pixel brightness between images with and without additional illumination, while less reflective surfaces, such as surfaces with matte finishes, cloth surfaces (e.g., drapery, cloth upholstered furniture, etc.), walls, and the like may have smaller differences in pixel brightness between images with and without additional illumination. In some embodiments, reflectivity of a surface may be determined independently of color information. To do so, images may be converted from a color image to a grayscale image (e.g., from an image with 8-bit red, green, and blue channels to an image with a single 8-bit greyscale channel), and pixel locations corresponding to an illuminated and unilluminated object may be identified. The difference between the brightness of these pixel locations may be mapped to an amount of reflectivity to be implemented by the shader, as discussed in further detail below. Generally, large differences in object brightness between images with and without additional illumination may indicate that an object is highly reflective, and thus that a shader should be configured to reflect a significant amount of light off of that object. Meanwhile, smaller differences in object brightness between images with and without additional illumination may indicate that an object has low reflectance or is not reflective, and thus that a shader should be configured to reflect a small amount of light off of that object. Further, information about the total area illuminated by a light source may be gathered from images of an object with and without additional illumination. For example, given a light source with a defined size, the size of the illuminated area of the object may be substantially similar to the size of the light source for highly reflective objects. Meanwhile, the size of the illuminated area of the object may be larger, but less intense, for objects that are not highly reflective (e.g., objects with a matte or antiglare finish). The size of the illuminated area of the object may thus be used alone or in conjunction with brightness information to determine the reflectivity of a surface and correspondingly how a shader is configured to reflect light from a computer-generated light source.

In some embodiments, room property identifier 112 can additionally or alternatively use object identification techniques to identify an object and search for information about that object (or the surface materials of that object) from a remote data repository (not illustrated). Room property identifier 112 can identify an object as a general class of object (e.g., a mirror, a desk, a chair, etc.) and can use portions of an image to identify a type of material the object is made from. For example, suppose that room property identifier 112 identifies an object as an upholstered chair. Room property identifier can then select a portion of an image including a portion of the upholstered chair and submit the portion of the image to a remote service to determine the type of material the chair is made from. Using the information about the type of object and the type of material, room property identifier 112 can search a lookup table of predefined reflectivity information to determine the reflectivity of the object for use in generating a shader that renders lighting effects on real-world objects, as discussed in further detail below.

Shader generator 114 uses the room geometry and reflectivity information to generate a shader used by head-mounted augmented reality display 100A to render lighting effects on real-world objects. Generally, shader generator 114 can use the determined room geometry to generate shader vertices and polygons that are used to overlay illumination effects on real-world objects in the real-world environment based on the introduction of a computer-generated light source in the head-mounted augmented reality display 100A. Generally, vertices may be positioned such that any number of vertices can be connected by edges, and multiple edges may form polygons in the shader. Generally, the shader vertices and polygons may be generated by shader generator 114 to account for the shape, size, and contours of real-world objects in the real-world environment that the augmented reality display 100A is operating.

In some embodiments, the shader generated by shader generator 114 may be configured with a plain white texture and vertices colored substantially similar to the tint of lens 140 of augmented reality display 100A. Generally, by generating the shader with a plain white texture and lens tint-colored vertices, the shader may be configured to be transparent or substantially transparent to a user of augmented reality display 100A. To compensate for differences in the reflectance of various surfaces in the real-world environment, polygons corresponding to different surfaces may be associated with different reflectivity properties so that when an artificial light source is introduced into a view of the real-world environment, the light reflected from each surface corresponds to the reflectivity of a surface (e.g., so that light is reflected at a higher intensity from more reflective surfaces and at a lower intensity from less reflective surfaces). In some embodiments, the vertices may be colored to effectively apply a color compensating filter to the augmented reality display 100A. For example, to compensate for a user deficiency in perceiving a particular color, the vertices may be colored according to a color that filters out colors that a user is unable to see. In still further embodiments, the shader generated by shader generator 114 may be configured with various colors of vertices so as to apply scenario-specific color tints to the real-world environment in which augmented reality display 100A is being used.

In some embodiments, room property identifier 112 and shader generator 114 may periodically scan the real-world environment in which the augmented reality display 100A is operating to identify changes to the real-world environment that are not reflected in the configuration of the generated shader. For example, these changes may include the introduction of new objects into the real-world environment, opening and closing of doors, windows, and other light entry apertures in the real-world environment, changes in the reflectivity of surfaces in the real-world environment (e.g., previously clear windows or mirrors becoming frosted over), and the like. In some embodiments, these changes may further include the introduction of fog, mist, or other weather effects that may change how light interacts with objects in the real-world environment. By periodically scanning the real-world environment and updating the shader based on each new scan of the real-world environment, room property identifier 112 and shader generator 114 can apply lighting effects to a shader corresponding to the current state of the real-world environment rather than an outdated state of the real-world environment. To use one example, suppose a solid wooden door with a minimally reflective surface is opened, occluding part of a chromed surface in the real-life environment. A previous shader configured for the previous state of the real-world environment (i.e., a state in which the solid wooden door was closed) may result in a lighting effect that applies the reflectivity of the chromed surface to the wooden door. By updating the shader to account for the opened door (and therefore the portion of the chromed surface obscured by the opened door), reflections may not be generated on surfaces that are no longer visible in the real-world environment.

After shader generator 114 generates the shader, shader generator 114 deploys the shader to scene renderer 118 for rendering and display to a user of the augmented reality display 100A. As discussed, in the absence of artificial light sources included in a view of the real-world environment, the shader rendered over the user's view of the real-world environment generally remains transparent to the user. Thus, in the absence of artificial light sources, a user should not be aware that graphical elements are being rendered on display 130 and overlaid on the user's view of the real-world environment.

Light source generator 116 may be a component of a game or other application that introduces lighting effects into a user's view of the real-world environment in which augmented reality display 100A is being used. Generally, light source generator 116 may define a position within display 130 at which a light source is to be introduced and various properties of the light source. For example, these properties may include a shape and size of the light source, a color of light, an intensity of the light, and so on. In some embodiments, light source generator 116 may generate lighting effects for a moving virtual light source in the augmented reality display. These moving light sources may be user-controlled (e.g., a laser sword controlled by a user in a game) or may be computer-controlled.

Light source generator 116 generally provides information about the generated light source to scene renderer 118 for use in adding lighting effects to the user's view of the real-world environment based on the generated shader. In some embodiments, for a light source overlaid on a given position in the real-world environment, scene renderer 118 can identify the vertices to illuminate to add lighting effects to the real-world environment. The vertices may be illuminated, for example, based on a color and intensity of the generated light source such that lighting effects are rendered with an intensity commensurate with the reflectivity of each service identified in the real-world environment and the distance between the user and each object in the real-world environment. Generally, for a given surface, reflectivity and other light effects may be modeled with less intensity (e.g., less brightness) as the distance between the generated light source and an object in the real-world increases. Further, scene renderer 118 may be configured to diffuse (e.g., spread) the lighting effects from a generated light source over larger areas based on the reflectivity properties of a given surface of an object in the real-world environment. For example, objects that have low reflectance surfaces may result in scene renderer 118 overlaying a larger, but less intense, illumination over the object to simulate the diffusion of reflected light that would occur on such a surface in real life. Meanwhile, objects with high reflectance surfaces may result in scene renderer 118 overlaying a smaller, but more intense, illumination over the object to simulate the reflection (e.g., as a point source) of light that would occur on a high reflectance surface in real life. In some embodiments, scene renderer 118 may additionally use reflectivity information to determine and render reflected and refracted light effects from one object to another object. For example, objects determined to be highly reflective may bounce light onto another object, and the lighting effects rendered on the other object may be a combination of illumination from the generated light source and reflected light from reflective objects in the real-world environment.

In some embodiments, illumination effects may be added to the real-world environment on a per-shader-pixel-fragment basis in lieu of or in conjunction with the vertex lighting techniques discussed above. Adding illumination effects for a shader pixel fragment may provide finer-grained control over the addition of illumination effects to real-world objects in the real-world environment. For example, the addition of illumination effects on a per-shader-pixel-fragment basis may allow for localized generation of lighting effects that may not be constrained by the size and shape of a polygon defined by connections between vertices in the shader. The addition of these illumination effects using shader pixel fragments may be used, for example, to add illumination effects to different edges of real-world objects (e.g., to add blooming or glare effects to edges of a real-world object based on the reflectivity of the real-world object), to render point-source reflections to a real-world object where the reflection is smaller than a polygon in the shader, and the like.

In some embodiments, illumination effects rendered using the shader may make physically bright surfaces optically darker and physically darker surfaces optically lighter. By rendering lighting effects as optically lighter for physically darker surfaces, an intensity of the lighting effects rendered on display 130 may blend with a color of lens 140 such that lighting effects over unilluminated or minimally illuminated real-world objects appear transparent to a wearer of augmented reality display 100A. Meanwhile, more intense lighting effects can be rendered as darker areas on display 130 (e.g., rendered as areas with more intense coloration and/or alpha channels that are opaque or near-opaque so that lighting effects are visible over the corresponding real-world object through lens 140.

Generally, the addition of illumination effects to real-world objects in the environment in which the head mounted display 100A is operating may be rendered such that adjustments to lighting effects are made with respect to a global perceptual anchor object. The global perceptual anchor may be monitored periodically (e.g., based on the objects visible to the user through lens 140. In some embodiments, the global perceptual anchor may be an arbitrarily selected object that is not expected to have significant brightness changes. By rendering lighting effects with respect to the global perceptual anchor object, scene renderer 118 need not attempt to render lights and colors that are out of range, as illuminations may be rendered so that the reflections are perceived as having sufficient brightness using small changes to the color and intensity of the rendered lighting effects.

Camera 120 is illustrated to be representative of various still or video image capture devices that may be used to capture images of the real-world environment in which an augmented reality device 100A operates. As discussed above, information about the real-world environment captured by camera 120 may be fed into environment property identifier 112 of processing system 110, where images are processed to identify the size and light reflectivity characteristics of objects in the real-world environment. In some embodiments, camera 120 may be mounted on a moving platform that moves to reflect the eye position of the user of augmented reality device 100A. Captured images of the real-world environment (or portion of the real-world environment) in which the user is using the augmented reality device 100A may be used to adjust the portion of a shader overlaid on the user's view of the real-world environment so that lighting effects are rendered on the appropriate objects and within the boundaries of each object as perceived by the user of the augmented reality device 100A.

Display 130 generally receives a rendered scene from scene renderer 118 for display to a user of the augmented reality device 100A. To allow augmented reality device 100A to function as a see-through device, display 130 may be a projector configured to project an image on lens 140. Generally, by projecting an image generated from lighting effects applied to a shader with transparent vertices, lighting effects may be overlaid on the user's view of the real-world environment so that reflections in the real-world environment are illuminated by the shader and other areas remain unilluminated so that the real-world objects remain visible to the user. When no artificial lighting sources are rendered in the scene, the shader may appear transparent to the user of the augmented reality device 100A so that the user can view the real-world environment without modification. Lens 140 may be an optical combiner configured to combine a projected image from display 130 with the real-world environment so that the combination of the real-world environment and the rendered artificial lighting sources are visible to the user of the augmented reality device 100A.

Figure 1B:
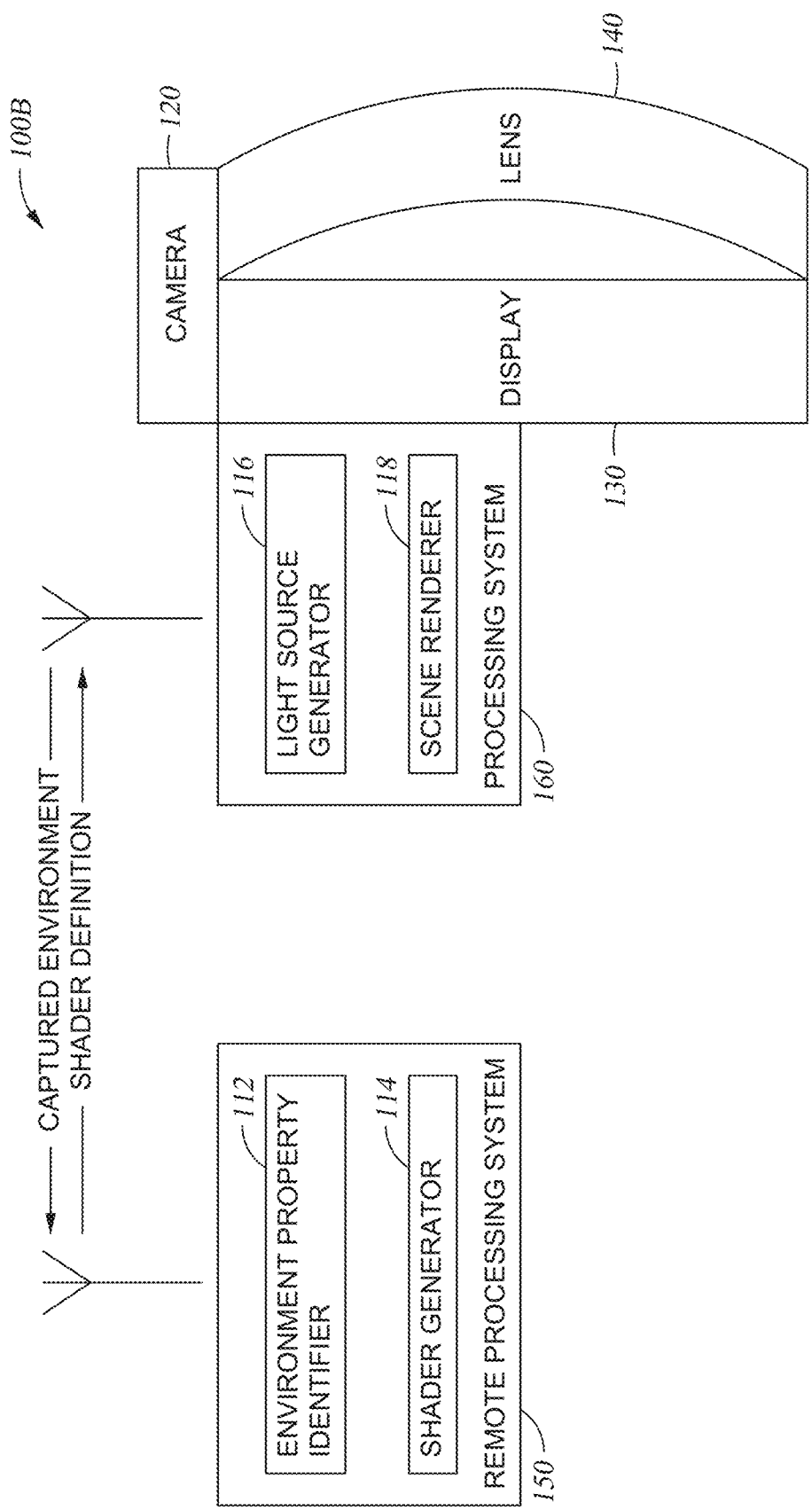
FIG. 1B is a block diagram of an augmented reality display in which a shader generated by a remote system is used to display lighting effects on objects in the real-world environment, according to one embodiment described herein.

FIG. 1B illustrates an augmented reality device 100B in which a shader is generated on a remote processing system an deployed to a processor on a head mounted display unit to render lighting effects on real-life objects. As illustrated, augmented reality device 100B includes a camera 120, display 130, lens 140, remote processing system 150, and head mounted display (HMD) processor 160. A head mounted display unit worn by a user of augmented reality device 100B may include camera 120, display 130, lens 140, and HMD processor 160 and may be connected via a network connection to remote processing system 150.

Remote processing system 150 is illustrative of various computing devices that can receive data from a client device and process the received data to generate a shader for use in augmenting a real-live environment with lighting effects from a computer-generated light source. As illustrated, remote processing system 150 includes environment property identifier 112 and shader generator 114. Remote processing system 150 generally receives images captured of the environment in which the augmented reality device 100B is operating from camera 120 for processing. Remote processing system 150 may receive these images wirelessly over a personal area network, a wireless local area network (e.g., an 802.11 WiFi network connection), or a wide area network (e.g., a cellular network) from camera 120. A wireless connection between remote processing system 150 and HMD processor 160 may generally be a low-latency, high bandwidth wireless connection that allows large amounts of data to be transmitted in short amounts of time. As remote processing system 150 receives images of the real-world environment in which augmented reality device 100B is operating, environment property identifier 112 can identify the shape and size of various objects in the real-world environment, as well as reflectivity properties of different surfaces in the real-world environment, as discussed above. Based on the identified shape and size of various objects in the real-world environment, shader generator 114 generates a shader with vertices having a color substantially similar to that of the lens 140 through which a user of the augmented reality device 100B views the real-world environment and a flat, white texture that is unilluminated in the absence of artificial light sources overlaid in the real-world environment. Once generated, shader generator 114 can transmit the generated shader definition to HMD processor 160 for use in rendering artificial light sources and reflections and overlaying these rendered light sources and reflections over real-world objects in augmented reality device 1006.

In some embodiments, room geometry identifier 112 need not identify properties of a room that may be used in rendering artificial light sources and reflections from these artificial light sources on objects in the real world. Room geometry identifier 112 can capture one or more images of the environment in which the display is being used and may query a data repository for information about the real-world environment. If a shader has previously been generated for a given environment, room geometry identifier 112 can obtain the matching shader from a remote destination and use the retrieved shader to render lighting effects in the augmented reality display 1006. As discussed, this information may include distance and reflection/refraction information so that the correct objects are illuminated when an artificial lighting source is introduced on screen 130.

HMD processor 160 is generally illustrative of various computing devices coupled with a head-mounted display that can generate artificial lighting sources on display 140 for display to a user, according to one embodiment. HMD processor, as illustrated, generally includes a light source generator 118 and a scene renderer 118. As discussed above, light source generator 118 is generally configured to render one or more artificial light sources for display over the real-world environment in which augmented reality device 1006 is operating, and scene renderer 118 is configured to use information about the rendered artificial light sources, the shader generated from the determined geometry of the real-world environment, and reflectivity information about each surface in the real-world environment to render light reflections and other lighting effects over various objects in the real-world environment. The rendered scene generated by scene renderer 118 may be transmitted to display 130, which projects the rendered scene onto lens 140 to combine the generated lighting effects with the real-world environment.

Figure 2:
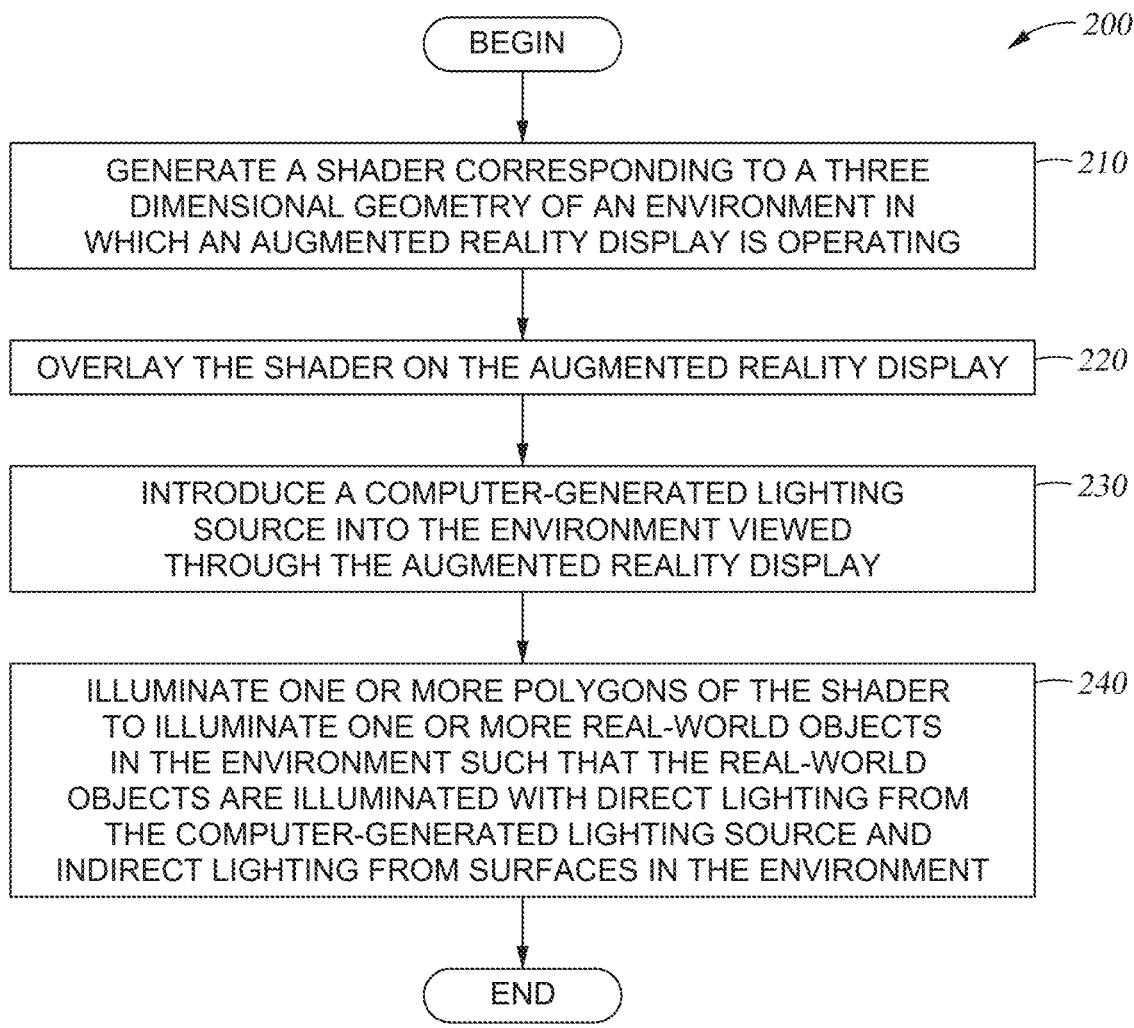
FIG. 2 illustrates example operations for rendering lighting effects on real-world objects in an augmented reality display using a shader and a computer-generated light source, according to one embodiment described herein.

FIG. 2 illustrates example operations that may be performed by an augmented reality device to render lighting effects on real-world objects in the environment in which the augmented reality device operates. As illustrated, operations 200 begin at block 210, where the augmented reality device generates a shader corresponding to a three-dimensional geometry of an environment in which the augmented reality display is operating. As discussed, in some embodiments, the augmented reality device can generate the shader by capturing one or more images of the real-world environment and using distance information derived from the captured images to identify surfaces in the real-world environment. Using the captured images, the augmented reality device can identify boundaries between different shapes in the real-world environment (corresponding to different surfaces) and can generate and connect vertices to form a vector map of a plurality of polygons. The shader may have a flat, uncolored texture, and the vertices may be colored substantially similarly to the color of the lenses of the augmented reality device, so that the shader is transparent to the user when computer-generated artificial light sources have not been overlaid on the real-world environment.

In some embodiments, the augmented reality device can generate a shader based on an a priori known arrangement of objects in the real-world environment. For example, if an augmented reality device is used in one of a set of known environments (e.g., in an entertainment setting where the architecture of the rooms in which the augmented reality device is to be used are known), the augmented reality system can use images captured by a camera of the augmented reality device to identify the room and retrieve a shader model corresponding to the room from a data repository.

At block 220, the augmented reality system overlays the shader on the augmented reality device. To overlay the shader on the augmented reality display, the augmented reality device can render a scene using the shader and use the display to project the rendered scene on top of the lenses of the augmented reality system. By projecting the rendered scene on top of the lenses, the system can add rendered content to the user's view of the real-world environment. Generally, when the augmented reality device has not rendered any artificial light sources for inclusion in the user's view of the real-world environment, the shader may be transparent to the user and thus may not modify the user's view of the real-world environment. In some embodiments, however, as discussed above, the shader may be customized to alter the user's view of the real world. For example, the shader may be customized to compensate for color vision deficiencies (e.g., red-green colorblindness, blue-yellow colorblindness, etc.) or to introduce a tint to the user's view of the real world environment in which the augmented reality device is being used.

At block 230, the augmented reality device introduces a computer-generated lighting source into the environment viewed through the augmented reality display. The computer-generated lighting source is generally a lighting source that is not present in the real-world environment and is rendered as an object overlaid on the real-world environment. Computer-generated lighting sources may be generated as static or moving objects and with static or dynamic lighting properties (e.g., a lighting source with a consistent color and/or brightness or a lighting source with changing color and/or brightness).

At block 240, the augmented reality device illuminates one or more polygons of the shader to illuminate one or more real-world objects in the real-world environment based on the computer-generated lighting source introduced into the environment at block 230. Generally, by illuminating one or more polygons of the shader and displaying the illuminated polygons over real-world objects in the user's view of the real-world environment, a user may perceive that real-world objects are illuminated with direct and indirect lighting. Generally, in illuminating polygons of the shader, the augmented reality device can use distance information between the augmented reality device and objects in the real-world environment, reflectivity information about each surface in the real-world environment, and the brightness of the computer-generated lighting source to determine the intensity and size of the lighting effects rendered over each real-world object in the real-world environment.

To render a lighting effect, a vector representing the characteristics of the computer-generated lighting source can be introduced into the shader. For each polygon in the shader, the augmented reality device can calculate the appearance of the polygon to overlay a lighting effect on a real-world object in the real-world environment. Generally, the area illuminated by the object may be determined based on the recorded reflectivity of each surface, as previously discussed, so that reflective surfaces have a brighter appearance than less reflective surfaces. Distance calculations between the computer-generated light source (which may be assumed to be at the same position as the user of the augmented reality device or at a different position) may be used to determine the size and intensity of an illumination effect, as reflections of objects may decrease in size and intensity as the distance between a light source and an object increases.

In some embodiments, the computer-generated lighting source can be rendered outside of the user's view of the real-world environment. To render a lighting source outside of the user's view of the real-world environment, a lighting source may be introduced at a pixel location outside of the resolution of the display components of the augmented reality device. For example, a lighting source may be introduced at a negative pixel location to generate a lighting effect from the left side of the display (horizontally) or the bottom of the display (vertically) or at a pixel location in excess of the horizontal resolution (i.e., a horizontal pixel location greater than or equal to 1920, on a 1080p display) or vertical resolution (i.e., a vertical pixel location greater than or equal to 1080, on a 1080p display) in order for the lighting source to not be visible to the user of the augmented reality device. Lighting effects may be rendered based on an assumed location and directionality of the lighting source so that real-world objects can be illuminated from computer-generated light sources that are not visible to the user.

Figure 3:
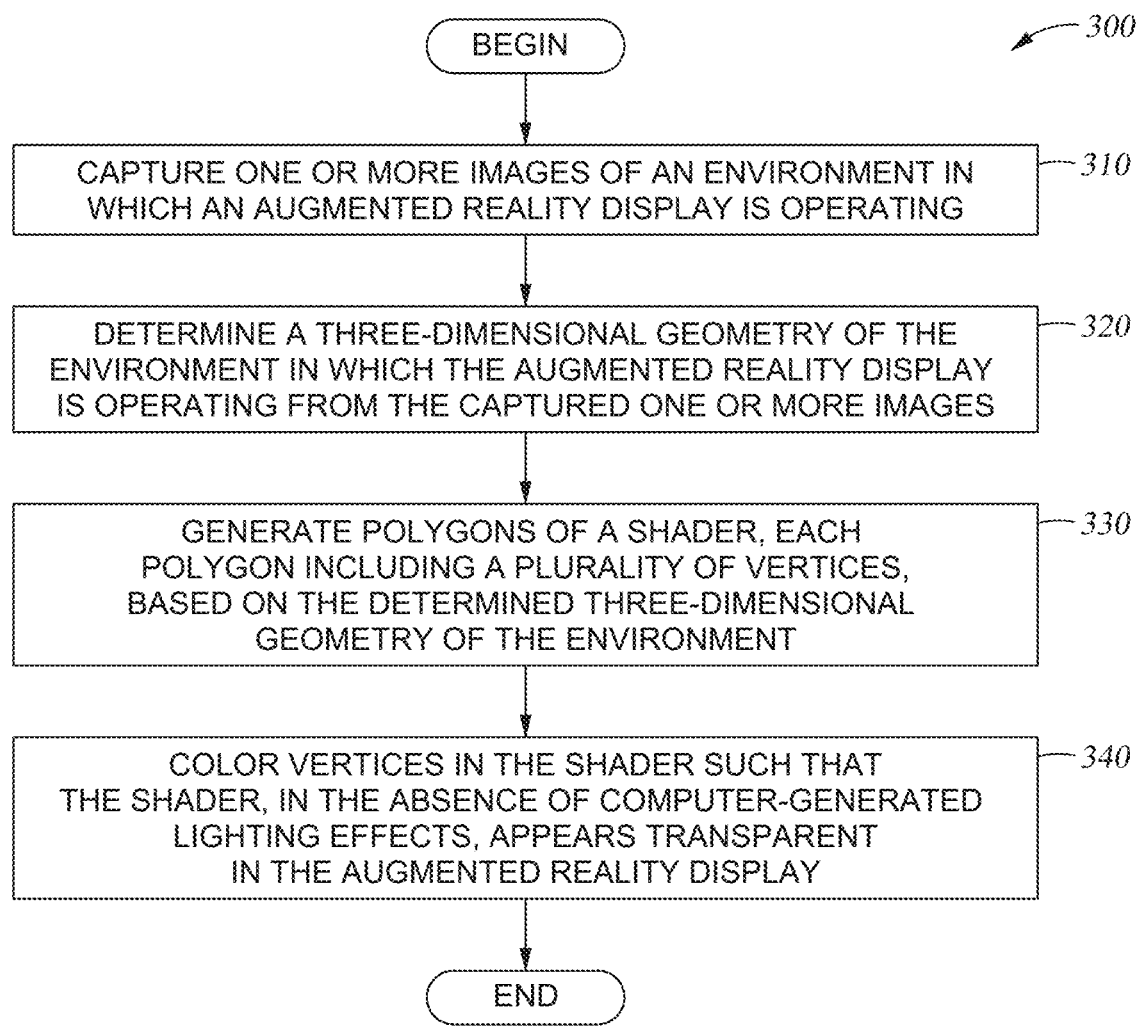
FIG. 3 illustrates example operations for generating a shader used in rendering lighting effects on real-world objects in an augmented reality display, according to one embodiment described herein.

FIG. 3 illustrates example operations that may be performed by an augmented reality device to generate a shader used to render lighting effects on real-world objects in which the augmented reality device operates. As illustrated, operations 300 begin at block 310, where the augmented reality device captures one or more images of an environment in which an augmented reality display is operating. The augmented reality device can capture these images using a camera integral to or otherwise coupled with the augmented reality device and can include distance information for each object in the real-world environment. In some embodiments, multiple images may be captured of a particular position in the real-world environment that the augmented reality device is being used in. Some of these images may be captured using available (ambient) light, and some of these images may be captured using additional illumination (e.g., a flash or continuous light source). As discussed, capturing images with and without additional illumination may allow the augmented reality device to capture additional information that may be used in rendering illuminations over real-world objects so that objects with more reflective surfaces have lighting effects rendered with more intensity than objects with less reflective surfaces.

At block 320, the augmented reality device determines a three-dimensional geometry of the real-world environment in which the augmented reality display is operating based on the captured one or more images. The three-dimensional geometry may be determined, for example, based on contours of objects detected in the captured images, distance information encoded in the image or otherwise captured by the camera, edges identified in the captured images, and the like. In some embodiments, some information about the three-dimensional geometry of the real-world environment may be obtained from a remote source. This information may include, for example, information about known room dimensions and other architectural features that may influence the three-dimensional geometry of the real-world environment. In some embodiments, where the augmented reality device is used in an open environment (e.g., outdoors), the three-dimensional geometry may be determined for objects within a threshold distance from the augmented reality display. Beyond this threshold distance, which may be an infinity focal distance of a camera coupled with the augmented reality device, objects may be assumed to have a two-dimensional appearance or not be relevant to the rendering of artificial lighting effects over real-world objects.

At block 330, the augmented reality device generates polygons of a shader based on the determined three-dimensional geometry of the environment. Polygons of the shader may be defined as a set of connected vertices that forms a shape in space. These polygons may be defined, for example, as shapes that account for the contours of each real-world object in the real-world environment. The polygons of the shader may be defined with a flat white texture so that when a polygon is illuminated, the polygon takes on the color of the light reflected on a surface. That is, if a light source is generated with a particular color and introduced into the user's view of the real-world environment, reflections of the light source from real-world objects are also some shade of that particular color (dependent on the reflectivity and light diffusion properties of an object, where more reflective objects have lighting effects that are brighter and closer to the particular color of the light source and less reflective objects have lighting effects that are a dimmer or lighter hue of the particular color of the light source).

At block 340, the system colors vertices in the shader such that the shader appears transparent in the augmented reality display in the absence of computer-generated lighting effects. Generally, the vertices in the shader may be colored with a color substantially similar to that of the lenses of the augmented reality display so that the shader is visually transparent to the user. As discussed, when artificial light sources are generated and overlaid on the user's view of the real-world environment, the shader may be illuminated based on the location of the artificial light source, the distance between the artificial light source and objects in the real-world environment, and the lighting properties of the artificial light source so that illuminated polygons in the shader are visually combined with the real-world objects to simulate the appearance of reflections or other lighting effects in the augmented reality view of the real-world environment.

Figure 4:
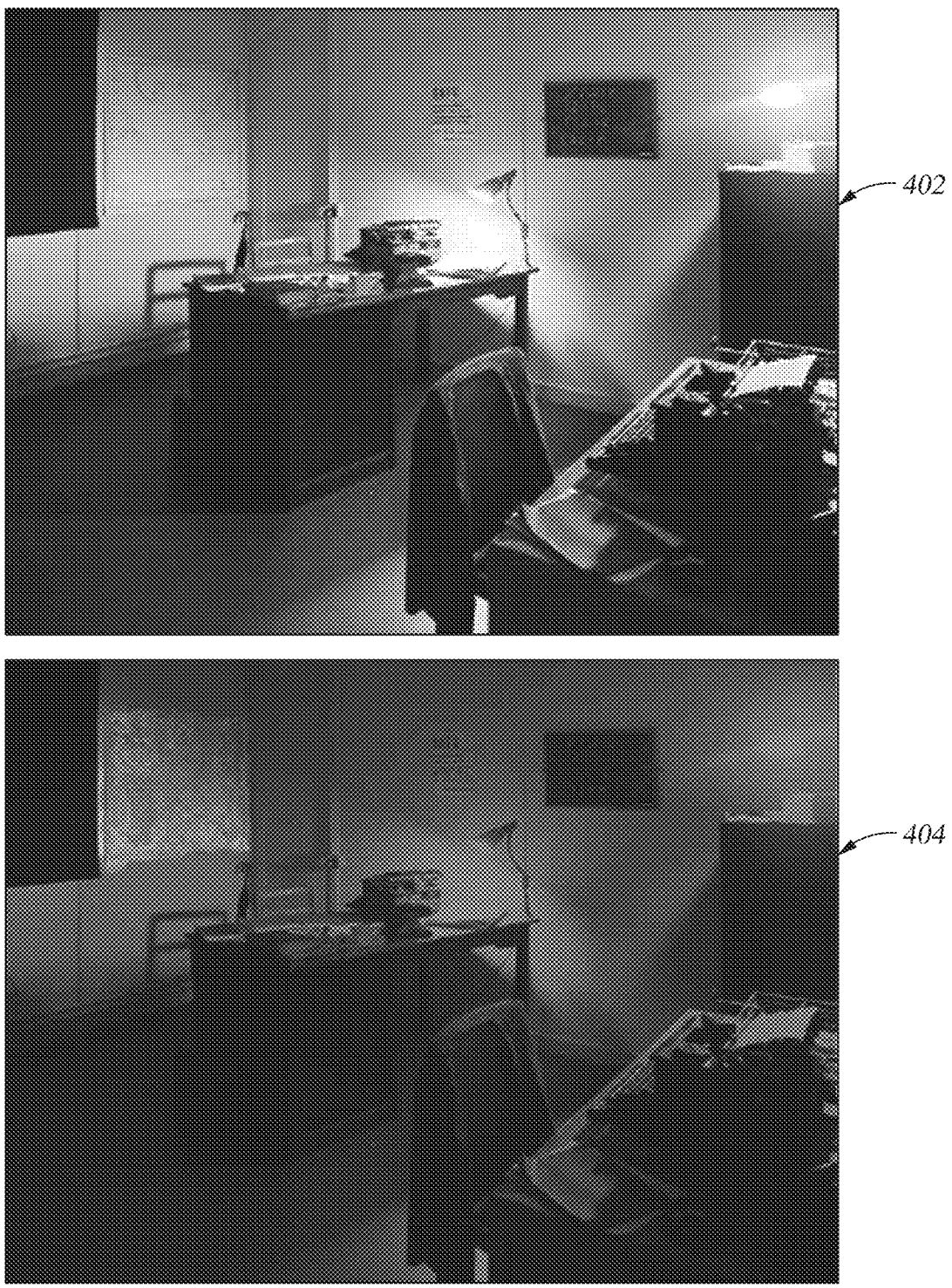
FIG. 4 illustrates an example environment in which an augmented reality display is operating and an example rendering of lighting effects on the environment, according to one embodiment described herein.

FIG. 4 illustrates images of a room with and without the application of lighting effects from a shader, according to embodiments described herein. Image 402 depicts a real-world environment in which an augmented reality device may be used to view the real-world environment and computer-generated content overlaid on the real-world environment. Generally, in the absence of additional computer-generated light sources, a user may see an image substantially similar to image 402 through the augmented reality device. As discussed, the shader generated from the three-dimensional geometry of the room may have a flat white color and vertices with the same or substantially similar color as the lenses of the augmented reality device so that the shader appears transparent to the user when rendered and overlaid on the user's view of the real-world environment in the absence of computer-generated light sources.

Image 404 depicts an augmented reality view of the environment illustrated in image 402 in which a light source is added to the real-world environment to introduce illumination effects to the real-world environment. In this example, the light source is positioned outside of the user's view of the real-world environment illustrated in image 402 and is directed towards the map on the wall on the left side of the image. Because lighting effects are additive in an optical see-through augmented reality device, the polygons of the shader corresponding to the location of the map in the user's view of the real-world environment may be illuminated based on the color and intensity of the computer-generated light source. The addition of a computer-generated light source and the illumination effects of the computer-generated light source on real-world objects may be used to simulate reflections on different surfaces caused by these light sources. In some embodiments, as illustrated in image 404, the addition of illumination effects from a computer-generated light source may be used to change the appearance of a real-world object displayed to a user of the augmented reality display (e.g., to make hidden content visible, such as a hidden treasure map in a standard map).

As illustrated, image 404 may be darker when viewed through lenses of a head-mounted augmented reality device than image 402. By darkening the user's view of the real-world environment prior to adding illumination effects to the real-world environment, augmentation of the real-world environment with illumination effects may allow for illumination effects to be added that is consistent with the relative illumination of the surfaces of real-world objects in the real-world environment. Darkening image 404 may thus allow for illumination effects to be overlaid over real-world objects in the real-world environment without clipping or rendering the lighting effects with excessive intensity.

Figure 5:
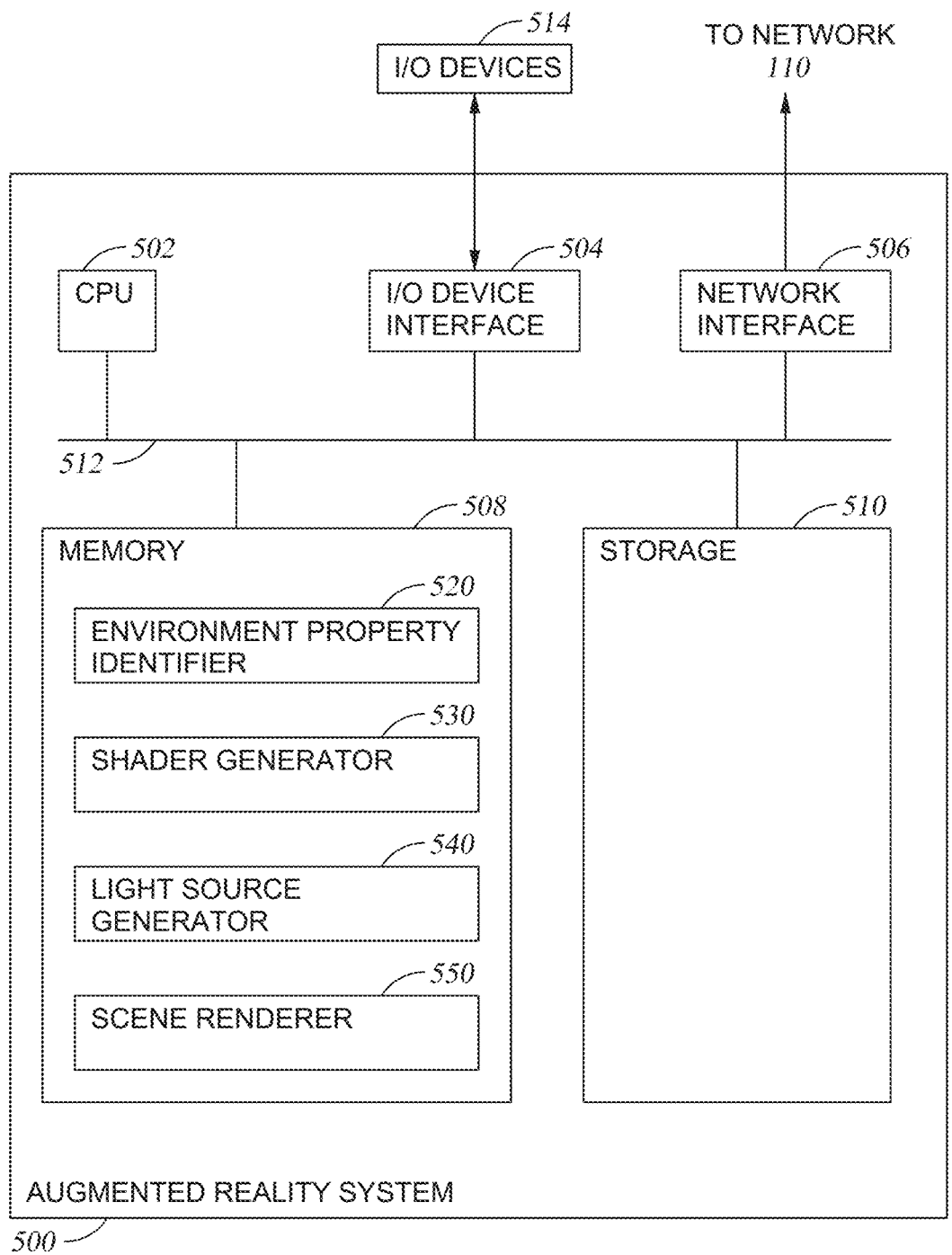
FIG. 5 illustrates an example system for rendering lighting effects on objects in a real-world environment visible in an augmented reality display, according to one embodiment described herein.

FIG. 5 illustrates an augmented reality system 500 on which shaders are generated from room geometry information and used to overlay lighting effects on real-world objects. Augmented reality system 500 may be representative, for example, of augmented reality devices 100A or 100B illustrated in FIG. 1A or 1B.

As illustrated, augmented reality system 500 includes a central processing unit (CPU) 502, one or more I/O device interfaces 504 that may allow for the connection of various I/O devices 515 (e.g., keyboards, displays, mouse devices, pen input, etc.) to the server 500, network interface 506 through which server 500 is connected to network 590 (which may be a local network, an intranet, the internet, or any other group of computing devices communicatively connected to each other), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As illustrated, memory 508 includes an environment property identifier 520, shader generator 530, light source generator 540, and a scene renderer 550. Environment property identifier 520 generally receives one or more images of the real-world environment in which augmented reality system 500 is being used to identify the three-dimensional geometry of the environment in which the augmented reality system 500 is being used, including information about different surfaces and different objects in the real-world environment. In some embodiments, as discussed above, the images may be captured with and without additional illumination, which may allow environment property identifier 520 to capture additional information about surfaces in the real-world environment that can be used to render reflected lighting effects over real-world objects.

Shader generator 530 generally uses the room geometry information and other information about the real-world environment identified by environment property identifier 520 to generate a shader corresponding to the real-world environment. Generally, the shader includes a plurality of polygons formed from a plurality of connected vertices, with each polygon representing a portion of an object in the real-world environment. The shader may be configured with a plain white texture and vertices colored substantially similar to a lens of augmented reality system 500 so that the shader appears transparent to the user.

Light source generator 540 generally generates artificial light sources and positions the generated light sources in the user's view of the real-world environment to introduce virtual objects into the user's view of the real-world environment. These artificial light sources may be stationary or may move throughout the user's view of the real-world environment, and the lighting properties of these artificial light sources may be arbitrarily defined so that a light can have a consistent or changing brightness, color, direction, and the like.

Scene renderer 550 uses information about the light sources generated by light source generator 540, environment property information identified by environment property identifier 520, and the shader generated by shader generator 530 to render lighting effects on real-world objects in the user's view of the real-world environment through augmented reality system 500. Generally, real-world objects may be illuminated by reflections determined based on the distance from a generated light source to an object, the reflectivity of the object, the brightness of the generated light source, and other relevant information. Polygons corresponding to objects that are illuminated may become visible to the user through a display connected to or integral with augmented reality system 500 so that the illuminated polygons and the object are combined to generate the user's view of the object.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for rendering lighting effects in an augmented reality display, comprising:
    overlaying, on an augmented reality display, a shader corresponding to a three-dimensional geometry of an environment in which the augmented reality display is operating, wherein the shader comprises a plurality of vertices forming a plurality of polygons, a flat texture on which lighting effects can be rendered, and a plurality of vectors, each vector defining a light reflectivity value corresponding to a respective surface in the environment in which the augmented reality display is operating;
    introducing a computer-generated lighting source into the augmented reality display, wherein the computer-generated lighting source comprises a light source that is absent from the environment in which the augmented reality display is operating and is rendered as an object overlaid in the environment in which the augmented reality display is operating; and
    illuminating one or more polygons of the shader, thereby illuminating, in the augmented reality display, one or more real-world objects in the environment with direct lighting from the computer-generated lighting source and reflected and refracted lighting from surfaces in the environment wherein illuminating the one or more polygons comprises generating an illumination effect for at least one of the one or more real-world objects in the environment in which the augmented reality display is operating such that illumination effects against objects with higher reflectivity surfaces appear brighter than illuminations against objects with lower reflectivity surfaces.

2. The method of claim 1, wherein the vertices of the shader have a color corresponding to a color of a display screen of the augmented reality display such that the shader, when unilluminated by the computer-generated lighting source, appears transparent.

3. The method of claim 1, further comprising:
    capturing the three-dimensional geometry of the environment in which the augmented reality display is operating based on a scan of the environment in which the augmented reality display is operating; and
    generating the shader based on the captured three-dimensional geometry of the environment, wherein the vertices in the shader correspond to edges of surfaces detected in the three-dimensional geometry of the environment.

4. The method of claim 3, further comprising:
    measuring reflectivity of the surfaces in the environment in which the augmented reality display is operating, wherein the plurality of vectors defining light reflectivity values corresponding to a respective surface in the environment are based on the measured reflectivity of the respective surface.

5. The method of claim 4, wherein illuminating the one or more real-world objects comprises decreasing values of one or more luminance channels for illuminated objects and increasing values of the one or more luminance channels for unilluminated objects such that illuminations against objects are perceived consistently through a tinted see-through optical display.

6. The method of claim 3, wherein generating the shader based on the captured three-dimensional geometry of the environment comprises transmitting one or more images of the environment to a remote system via a low latency, high bandwidth network connection.

7. The method of claim 1, wherein the three-dimensional geometry of the environment comprises a predefined three-dimensional model of the environment generated according to a known architectural layout of the environment and reflectivity of surfaces in the environment.

8. The method of claim 1, wherein the vertices of the shader are colored to compensate for color vision deficiencies of a user.

9. The method of claim 1, further comprising:
    updating the three-dimensional geometry of the environment based on a detected change in the environment.

10. The method of claim 9, wherein updating the three-dimensional geometry of the environment comprises:
    measuring reflectivity of one or more changed surfaces identified in the detected change in the environment; and
    updating one or more vectors in the shader based on the measured reflectivity of the one or more changed surfaces.

11. A system, comprising:
    a processor; and
    a memory having instructions stored thereon which, when executed by the processor, performs an operation for rendering lighting effects in an augmented reality display, the operation comprising:
        overlaying, on an augmented reality display, a shader corresponding to a three-dimensional geometry of an environment in which the augmented reality display is operating, wherein the shader comprises a plurality of vertices forming a plurality of polygons, a flat texture on which lighting effects can be rendered, and a plurality of vectors, each vector defining a light reflectivity value corresponding to a respective surface in the environment in which the augmented reality display is operating;
        introducing a computer-generated lighting source into the augmented reality display, wherein the computer-generated lighting source comprises a light source that is absent from the environment in which the augmented reality display is operating and is rendered as an object overlaid in the environment in which the augmented reality display is operating; and
        illuminating one or more polygons of the shader, thereby illuminating, in the augmented reality display, one or more real-world objects in the environment with direct lighting from the computer-generated lighting source and reflected and refracted lighting from surfaces in the environment wherein illuminating the one or more polygons comprises generating an illumination effect for at least one of the one or more real-world objects in the environment in which the augmented reality display is operating such that illumination effects against objects with higher reflectivity surfaces appear brighter than illuminations against objects with lower reflectivity surfaces.

12. The system of claim 11, wherein the vertices of the shader have a color corresponding to a color of a display screen of the augmented reality display such that the shader, when unilluminated by the computer-generated lighting source, appears transparent.

13. The system of claim 11, wherein the operation further comprises:
   capturing the three-dimensional geometry of the environment in which the augmented reality display is operating based on a scan of the environment in which the augmented reality display is operating;
   measuring reflectivity of the surfaces in the environment in which the augmented reality display is operating; and
   generating the shader based on the captured three-dimensional geometry of the environment and the measured reflectivity of the surfaces in the environment, wherein the vertices in the shader correspond to edges of surfaces detected in the three-dimensional geometry of the environment and the plurality of vectors defining light reflectivity values corresponding to a respective surface in the environment are based on the measured reflectivity of the surfaces in the environment.

14. The system of claim 13, wherein illuminating the one or more real-world objects comprises decreasing values of one or more luminance channels for illuminated objects and increasing values of the one or more luminance channels for unilluminated objects such that illuminations against objects are perceived consistently through a tinted see-through optical display.

15. The system of claim 13, wherein generating the shader based on the captured three-dimensional geometry of the environment comprises transmitting one or more images of the environment to a remote system via a low latency, high bandwidth network connection.

16. The system of claim 11, wherein the three-dimensional geometry of the environment comprises a predefined three-dimensional model of the environment generated according to a known architectural layout of the environment and reflectivity of surfaces in the environment.

17. The system of claim 11, wherein vertices of the shader are colored to compensate for color vision deficiencies of a user.

18. The system of claim 11, wherein the operation further comprises:
   updating the three-dimensional geometry of the environment based on a detected change in the environment.

19. The system of claim 18, wherein updating the three-dimensional geometry of the environment comprises:
   measuring reflectivity of one or more changed surfaces identified in the detected change in the environment; and
   updating one or more vectors in the shader based on the measured reflectivity of the one or more changed surfaces.

20. A head-mounted display for rendering augmented reality experiences, comprising:
   a non-blocking display screen through which an environment in which the head-mounted display is operating is visible; and
   a system for rendering content on the non-blocking display screen, the system being configured to:
      overlay, on the non-blocking display screen, a shader corresponding to a three-dimensional geometry of the environment in which the head-mounted display is operating, wherein the shader comprises a plurality of vertices forming a plurality of polygons, a flat texture on which lighting effects can be rendered, and a plurality of vectors, each vector defining a light reflectivity value corresponding to a respective surface in the environment in which the head-mounted display is operating;
      rendering a computer-generated lighting source on the non-blocking display screen, wherein the computer-generated lighting source comprises a light source that is absent from the environment in which the head-mounted display is operating and is rendered as an object overlaid in the environment in which the head-mounted display is operating; and
      illuminating one or more polygons of the shader, thereby illuminating, on the non-blocking display screen, one or more real-world objects in the environment with direct lighting from the computer-generated lighting source and reflected and refracted lighting from surfaces in the environment rendered on the non-blocking display screen, wherein illuminating the one or more polygons comprises generating an illumination effect for at least one of the one or more real-world objects in the environment in which the head-mounted display is operating such that illumination effects against objects with higher reflectivity surfaces appear brighter than illuminations against objects with lower reflectivity surfaces.

* * * * *